Patented July 6, 1943

2,323,357

UNITED STATES PATENT OFFICE 2,323,357

ALCOHOLIC UREA-FORMALDEHYDE RESIN SOLUTION

Israel Rosenblum, New York, N. Y.

No Drawing. Application August 19, 1938, Serial No. 225,721

13 Claims. (Cl. 260—29)

The present invention relates to the production of urea-formaldehyde resin compositions suitable for the manufacture of coating compositions.

It is the general object of the invention to provide an easily controllable, simple and economical method of preparing solutions of urea resins suitable for use in the manufacture of lacquers, paints, varnishes and the like.

The condensation products of urea and formaldehyde are hydrophilic in nature in certain stages of condensation. Doubtless due, at least in part, to this hydrophilic character, it has been found in practice to be extremely difficult to remove the water from an aqueous urea-formaldehyde condensate without danger of conversion of the resin into the insoluble gel condition. The tenacity with which water is retained by the condensate makes it necessary to heat the aqueous mixture for long periods at high temperatures, the condensate being thus exposed to conditions favorable to conversion thereof to the infusible and insoluble state.

It has been suggested that this difficulty in producing water-free urea-formaldehyde resins may be overcome by employing crystalline dimethylolurea, as by heating the same in the dry condition with a higher alcohol, such as butanol, or the like. The heating is effected in an acid medium and a resin is formed which is soluble in butanol but insoluble in water. The condensate is then made neutral or weakly alkaline (pH 7–8) and heated to about 130° C. to effect distillation and further resinification. In this way there is obtained a viscous solution of urea-formaldehyde resin in butanol. This procedure has, however, a number of disadvantages, for it necessitates an initial and separate process for the manufacture of dimethylolurea which involves the difficult task of separating the water from the dimethylolurea. The latter is formed by reaction of 1 mol of urea with 2 mols of aqueous formaldehyde and is insoluble in water, but soluble in water containing formaldehyde. In this process, furthermore, a considerable amount of urea, formaldehyde, and water-soluble condensate is lost in the separated water, especially as the dimethylolurea represents only a lower stage of condensation, and must be precipitated, filtered and dried. The yield of dimethylolurea is therefore comparatively low. Moreover, the dimethylolurea is difficult to dry, for it is unstable and tends to become insoluble and non-resinifiable on dehydration at higher temperatures.

It has also been suggested to operate with butanol but without initial isolation of dimethylolurea. According to this mode of operation, more than 2 mols of formaldehyde (usually 3 to 5 mols of formaldehyde) to each mol of urea are employed, the excess formaldehyde acting to keep the dimethylolurea in solution. Usually, an alkaline catalyst and an alkaline-reacting buffer salt are employed, together with butyl alcohol. To complete the condensation, a temperature of 120–130° C. must ordinarily be reached. However, the mixture of urea, formaldehyde, butanol, water and catalyst boils at about 95–100° C., at which temperature water, formaldehyde and butyl alcohol are evaporated. To avoid foaming and gelling, it is necessary to add butyl alcohol repeatedly. The boiling temperature gradually rises, but the butyl alcohol content must be repeatedly replenished, especially when the danger of gelling appears. This procedure is time-consuming and is uneconomical by reason of the loss of butyl alcohol and formaldehyde; even where the latter are recovered, a special process must be conducted for their purification. Thus, to effect complete resinification of the urea and formaldehyde and produce a solution corresponding to equal parts of condensate and butyl alcohol, a quantity of butyl alcohol, as much as 6 to 8 times that of the urea must be employed, the difference between this amount of butyl alcohol and that remaining in the end product being evaporated during the condensation.

The present invention provides a process for the condensation of urea and aqueous formaldehyde whereby a much smaller quantity of butyl alcohol or other organic solvent need be added to the reaction solution than heretofore, and wherein the loss of materials is considerably reduced while at the same time the operation is made safer and easier to control.

I have found that if a mixture of urea, aqueous formaldehyde, and butanol, with or without added catalyst, is heated under pressure, thereby enabling the initial reaction temperature to be raised above that possible on working at ordinary pressure, the resinification can be brought to an advanced but still intermediate stage without loss of butanol (or other solvent); and further, that under certain conditions the condensate can be converted into a condition in which on cooling it separates readily from a large part of the water. By heating the mixture prior to distillation, for example to 110–120° C. for 12 to 24 hours at 10 to 30 lbs. pressure, or higher, that is, to a temperature considerably above that initially possible with operation at atmospheric pressure, a stage of resinification is reached before distillation is begun in which the resin is not so strongly hydrophilic in character and can be more readily separated from the water or dehydrated; in fact, the resin may be converted into a form in which it is insoluble or only slightly soluble in water; while hot, however, the aqueous mixture is quite uniform in character. When the resin has been reacted to the more or less hydrophobic condition, then, upon cooling the reaction mixture, for example to about room temperature, a definite separation into layers takes place, a smaller aqueous layer forming at the bottom of the vessel, while a more voluminous layer forms above the water, the upper layer containing the resin, most of the butanol, and some water. When such mechanical separation is effected, the maximum total loss of urea and formaldehyde and their condensate in the lower aqueous layer is in the neighborhood of 10% for the pressure range indicated, but may be reduced by the use of higher pressures and correspondingly higher temperatures and/or longer periods of reaction.

In some cases, or if preferred, the reaction mixture may be distilled immediately after the pressure treatment, whether or not it is of the type that would separate into layers on cooling; because of the high degree of initial condensation, the losses on distillation, as regards time of heating and materials, are much smaller than heretofore. However, when the initial condensate is strongly hydrophobic, it is advantageous, although not essential, to cool the product and separate the resinous from the aqueous layer, for in such case it is as easy to distill the resinous layer as in the case of phenol-formaldehyde resins. Thus, by heating the mixture under pressure and syphoning off the aqueous layer of the cooled reaction product, the reaction and distillation time is greatly reduced, while the control of the reaction is greatly facilitated since the danger of gelling is practically eliminated. Only one or two additions of butanol will be required during the distillation to effect completion of the resinification and expulsion of water, so that whereas according to prior processes as much as 6 to 8 parts of butanol had to be employed for each part of urea, only about 4 parts need be employed in accordance with my improved process to produce a 1:1 solution of urea resin in butanol. By reducing the number of times that the butanol must be added, and hence also the quantity of butanol introduced, I not only reduce the loss of butanol, but also the time required for distillation, since each addition of butanol results in a drop in the temperature of the resinous mixture and must be distilled off to bring the final product to approximately a 1:1 proportion of resin to solvent.

Even if the condensate produced by the heating under pressure is not of the separating type, as when no catalyst and/or excess formaldehyde is used, the subsequent distillation is less troublesome and easier to control, and the losses are lower, than in the known method of heating and distilling a urea-formaldehyde-butanol mixture produced at atmospheric pressure.

The invention will be further described with the aid of the following examples which are presented by way of illustration only.

*Example 1*

| | Grams |
|---|---|
| Urea | 1,000 |
| Aqueous formaldehyde solution (37½% by weight, amounting to 3 mols to each mol of urea) | 4,000 |
| Butanol | 2,000 | are mixed until a uniform solution is obtained. To this mixture there are added 100 grams of commercial ammonia (27–28%) and 1 gram of oxalic acid and the mass is again stirred until uniform.

This charge is now heated in a suitable vessel for 12 to 24 hours at about 110–120° C. under a pressure of 10 to 20 lbs. or thereabouts. The reaction mass is then allowed to cool to about room temperature, whereupon it separates into two, quite distinct layers. This cooling may be allowed to take place in the reaction kettle or in a separate vessel. The water layer is then separated from the resinous layer, as by syphoning, or in any other suitable way. The upper layer, which contains the resinous condensate and most of the butanol, is now subjected to distillation to effect dehydration. The condensate solution can be readily converted into a 1:1 solution of the urea resin in butanol by gradually heating the resin-containing layer to a temperature of about 120–130° C. (or 105–110° C. in a vacuum of about 15 inches). Only two or three small additions of butanol will be required during the distillation process to maintain the process entirely safe against the danger of gelation. There is obtained a colorless solution which is capable of yielding colorless, tough, adherent films, and which is particularly suitable for mixing with alkyd resins of various kinds to form stable resin compositions, the mixture being usable as such or in combination with nitrocellulose solution.

*Example 2*

| | Grams |
|---|---|
| Urea | 1,000 |
| Formaldehyde solution (37½% by weight, amounting to 4 mols to each mol of urea) | 5,300 |
| Butanol | 3,000 |
| Commercial ammonia | 100 |
| Maleic anhydride | 1 | are mixed until uniform and then subjected to 110–120° C. under a pressure of about 20 lbs. gauge, this pressure being maintained in the reaction vessel by means of a pressure valve, or by "cracking" the outlet valve, or in any other suitable way. The heating time, as in Example 1, may be from 12 to 24 hours, but in any event should be sufficiently long to insure an advanced stage of condensation. The mass may then be permitted to cool under atmospheric pressure, the aqueous layer separated and the resin-containing butanol solution then gradually distilled, with two or three intermediate additions of butanol, when the foaming becomes excessive, until a temperature of about 120–130° C. is reached. A dehydrated, approximately 1:1 solution of the resin in butanol in the form of a slightly colored, clear, viscous syrup is obtained. The dehydration may be effected under higher degrees of vacuum than that indicated above (15 inches of mercury); it is, however, generally advantageous to employ a temperature of at least about 105° during the final stage of dehydration.

The reaction mixtures obtained in the manner hereinabove described need not be cooled to effect separation of water prior to the distillation. Immediately after the pressure heating, the hot reaction mass, which is in the form of a uniform solution or mixture, can be subjected to distillation, the latter being conducted as described above. The distillation may, if desired, be effected under a suitable super-atmospheric pressure. Even without the intermediate mechanical separation of water, the reaction mass, doubtless by reason of the fact that the condensation has reached an advanced stage during the pressure heating, can be distilled with much greater ease and with much greater safety than the mixtures heretofore obtained by condensation at the lower temperatures associated with operation at atmospheric pressure. The mechanical separation of the water-soluble, non-resinifiable material will, however, generally be found to facilitate the working up of the resinous condensate.

The condensate, and also any free urea and formaldehyde, contained in the drawn-off water can be utilized in various ways, as for the manufacture of aqueous urea-formaldehyde condensates for use for other purposes than lacquer and varnishes.

The urea may be replaced by thiourea, and by other ureas, as is well known in the art, while other solvents may be employed, either alone or in admixture with butanol, such as propyl and amyl alcohols, terpineol, acetone and other ketones, the alcohols boiling higher than water, and particularly butanol, being preferred.

The urea-formaldehyde resin may be combined that is, uniformly blended in any suitable proportions with alkyd resins, including those in which maleic or succinic acid replaces all or part of the phthalic acid, particularly those modified with vegetable oils or their acids, especially non-air-drying acids, such as the acids of coconut, rapeseed, castor and other oils and mixtures thereof, and the urea and formaldehyde may be reacted under pressure in the presence of such resins and of the organic solvent.

The catalyst and buffer compound can be employed in any order. The ratio of formaldehyde or other aldehyde to urea may vary within rather wide limits, but satisfactory results are obtained by the employment of about 3 to 5 mols of formaldehyde to each mol of urea.

I claim:

1. The method of producing solutions of urea-formaldehyde condensate which form stable mixtures with oil acid-modified alkyd resins, which comprises reacting a urea and aqueous formaldehyde in the presence of an alcoholic solvent under pressure sufficient to enable a reaction temperature of at least about 110° C. to be obtained, continuing the heating under pressure until an advanced stage of condensation is reached and a hydrophobe condensate is obtained, cooling the reaction mixture, whereupon two liquid layers are formed, and separating the upper, resin-containing layer from the lower, aqueous layer.

2. The method of producing solutions of urea-formaldehyde condensate which form stable mixtures with oil acid-modified alkyd resins, which comprises reacting a urea and aqueous formaldehyde in the presence of an alcoholic solvent under pressure sufficient to enable a reaction temperature of at least about 110° C. to be obtained, continuing the heating under pressure until an advanced stage of condensation is reached and a hydrophobe condensate is obtained, cooling the reaction mixture, whereupon two liquid layers are formed, and distilling the resin solution until a dehydrated composition containing approximately equal parts of urea resin and alcoholic solvent is obtained.

3. The method according to claim 1 wherein the molecular proportion of formaldehyde to the urea is approximately 3:1.

4. The method of producing solutions of urea-formaldehyde condensate which form stable mixtures with oil acid-modified alkyd resins, which comprises heating urea with at least about 3 molecular proportions of aqueous formaldehyde in the presence of butyl alcohol under super-atmospheric pressure until an advanced stage of condensation is reached in which the urea-formaldehyde condensate is still soluble in butyl alcohol but is insoluble in water, cooling the reaction mixture, separating the resin-containing layer from the lower aqueous layer, and further distilling the resinous mixture until a dehydrated composition of the desired viscosity is obtained.

5. The method according to claim 4 wherein an excess of ammonia and an ammonium salt of an organic acid are employed as catalysts.

6. The method of producing solutions of urea-formaldehyde condensates which form stable mixtures with oil acid-modified alkyd resins, which comprises reacting one mol of urea and three mols of aqueous formaldehyde in the presence of butanol under superatmospheric pressure until an advanced stage of condensation is reached, and thereafter distilling the condensation mixture until a substantially dehydrated resin solution is obtained.

7. The method according to claim 4 wherein an excess of inorganic hydroxide and a salt of a dibasic organic acid are employed as catalysts.

8. A resinous solution prepared in accordance with the process of claim 1.

9. A resinous solution prepared in accordance with the process of claim 4.

10. The method of producing solutions of urea-formaldehyde condensates which form stable mixtures with oil acid-modified alkyd resins which comprises reacting a urea and aqueous formaldehyde in the presence of an alcoholic solvent of higher boiling point than water and under superatmospheric pressure until the hydrophobic condition of the condensate at room temperature is reached, and thereafter distilling the condensation mixture until a substantially dehydrated resin solution is obtained.

11. The method according to claim 10, wherein the alcoholic solvent is butanol.

12. The method according to claim 10, wherein the urea-formaldehyde condensate is produced by reacting urea with formaldehyde in the presence of ammonia, and wherein the alcoholic solvent is butanol.

13. The method according to claim 10, wherein the molecular proportion of urea to formaldehyde is about 1 to 3, and wherein the initial condensation takes place in the presence of a basic catalyst.

ISRAEL ROSENBLUM.